United States Patent [19]

Rosenberg

[11] Patent Number: 5,695,882
[45] Date of Patent: Dec. 9, 1997

[54] SYSTEM FOR EXTRACTING SOLUBLE HEAVY METALS FROM LIQUID SOLUTIONS

[75] Inventor: Edward Rosenberg, Missoula, Mont.

[73] Assignee: The University of Montana, Missoula, Mont.

[21] Appl. No.: 516,288

[22] Filed: Aug. 17, 1995

[51] Int. Cl.$^6$ ...................................................... B32B 1/10
[52] U.S. Cl. ........................ 428/405; 428/447; 502/401; 502/407; 210/688
[58] Field of Search .................................. 428/405, 447; 502/401, 407; 210/688

[56] References Cited

U.S. PATENT DOCUMENTS

| | | | |
|---|---|---|---|
| 4,469,630 | 9/1984 | Flashner | 260/112 B |
| 4,512,898 | 4/1985 | Oi et al. | 210/656 |
| 4,540,486 | 9/1985 | Ramsden | 210/198.2 |
| 4,551,245 | 11/1985 | Ramsden et al. | 210/198.2 |
| 4,600,646 | 7/1986 | Stout | 428/405 |
| 4,604,207 | 8/1986 | Oi et al. | 210/635 |
| 4,606,825 | 8/1986 | Crane et al. | 210/635 |
| 4,661,248 | 4/1987 | Ramsden et al. | 210/198.2 |
| 4,755,294 | 7/1988 | Pradet et al. | 210/198.2 |
| 4,775,725 | 10/1988 | DePasquale et al. | 525/403 |
| 4,804,686 | 2/1989 | Regnier et al. | 521/28 |
| 4,847,150 | 7/1989 | Glajch et al. | 428/447 |
| 4,950,634 | 8/1990 | Williams et al. | 502/401 |
| 5,066,395 | 11/1991 | Ramsden et al. | 210/198.2 |
| 5,085,779 | 2/1992 | Crane et al. | 210/635 |
| 5,087,359 | 2/1992 | Kakodkar et al. | 210/198.2 |
| 5,092,992 | 3/1992 | Crane et al. | 210/198.2 |
| 5,240,602 | 8/1993 | Hammen | 210/198.2 |

FOREIGN PATENT DOCUMENTS

| | | | |
|---|---|---|---|
| 0268243 | 5/1988 | European Pat. Off. | B01J 20/32 |
| 0269447 | 6/1988 | European Pat. Off. | B01J 20/32 |
| 0403700 | 12/1990 | European Pat. Off. | B01J 20/32 |
| WO 88/00860 | 2/1988 | WIPO | B01J 20/32 |
| 93/25307 | 12/1993 | WIPO . | |
| WO 93/25307 | 12/1993 | WIPO . | |

OTHER PUBLICATIONS

Anal. Chem. 1993, 65, 822–826; Mar. 15, 1993; Wirth and Fatunmbi; "Horizontal Polymerization of Mixed Trifunctional Silanes on Silica".
Anal. Chem. 1993, 65, 2048–2054; Aug. 8, 1993; Fatunmbi, Burch and Wirth; "Si and C NMR of Mixed Horizontally Polymerized Monolayers on Silica Gel".
Langmuir 1991, 7, 1647–1651; Silberzan, Leger, Ausserre and Benattar; "Silanation of Silica Surfaces".
J. Am. Chem. Soc. 1989, 111, 7164–7175; Bain and Whitesides; "Formation of Monolayers by the Coadsorption of Thiols on Gold".
J. Am. Chem. Soc. 1989, 111, 7155–764; Bain, Evall and Whitesides; "Foremation of Monolayers by the Coadsorption of Thiols on gold".
J. Am. Chem. Soc. 1989, 111, 5852–5861; Wasserman, Whitesides, Tidswell, Ocko, Pershan and Axe; "The structure of Self–Assembled Monolayers of Alkylsiloxanes of Silicon".
J. Am. Chem. Soc. 1988, 110, 6136–6144; Tillman, Ulman. Schildkraut and Penner; "Incorporatiion of Phenoxy Groups in Self–Assembled Monolayers of Trichlorosilane Derivatives".
Journal of Chromatography, 392 (1987) 11–16; Jones; "Optimisation Procedure for the Silanisation of Silicas for Reversed–Phase High–Performance Liquid Chromatography".
Chromatographia vol. 21, No. 8, Aug. 1986, 451–453; Ericsson and Colmsjo; "Thiophenepropyltrichloro Silane as Chemical Modifier on Silicagel for Reversed Phase Chromatography".
Thin solid Films, 132 (1985) 153–162; Pomerantz and Segmuller; "Coverage of Si Substrates by Self–Assembling Monolayers and Multilayers".
Journal of Colloid and Interface Science vol. 100 No. 2, Aug. 1874; Maoz and Sagiv; "On the Formation Formation and Structure of Self–Assemblng Monolayers"; 465–496.
Journal of the Amer. Chem. Soc. 102:1 Jan. 2, 1980; 92–98; Sagiv; "Organized Monolayers by Adsorption".

Primary Examiner—Margaret W. Glass
Attorney, Agent, or Firm—Harry M. Cross, Jr.

[57] ABSTRACT

A process for removing ions of dissolved heavy metals and complex heavy metals comprises provides a treatment zone in which is contained an extraction material having an activated surface that has an affinity for heavy metal ions and complex heavy metal ions. The activated surface is the reaction product of a polyamine with a covalently anchored trifunctional hydrocarbyl silyl that yields non-crosslinked amino groups to which functional chelator groups can be covalently attached. The activated surface of the extraction material is formed by first hydrating the extraction material surface and then silanizing the hydrated surface with a short chain trifunctional silane having a hydrocarbon substituent containing 1–6 carbon atoms and a terminal leaving group, and then reacting a polyamine with the hydrocarbylsilyl from the silanization of the hydrated surface so as to form an aminohydrocarbyl polymer covalently bound to the extraction material surface. The extraction material surface yields amino groups that are available for bonding to chelator groups. As thus formed, the polymer may be alkylated with a carboxyl or sulfur containing alkylating reagent on at least some of the amino groups to enhance and specialize the chelating ability of the extraction material's activated surface.

30 Claims, 9 Drawing Sheets

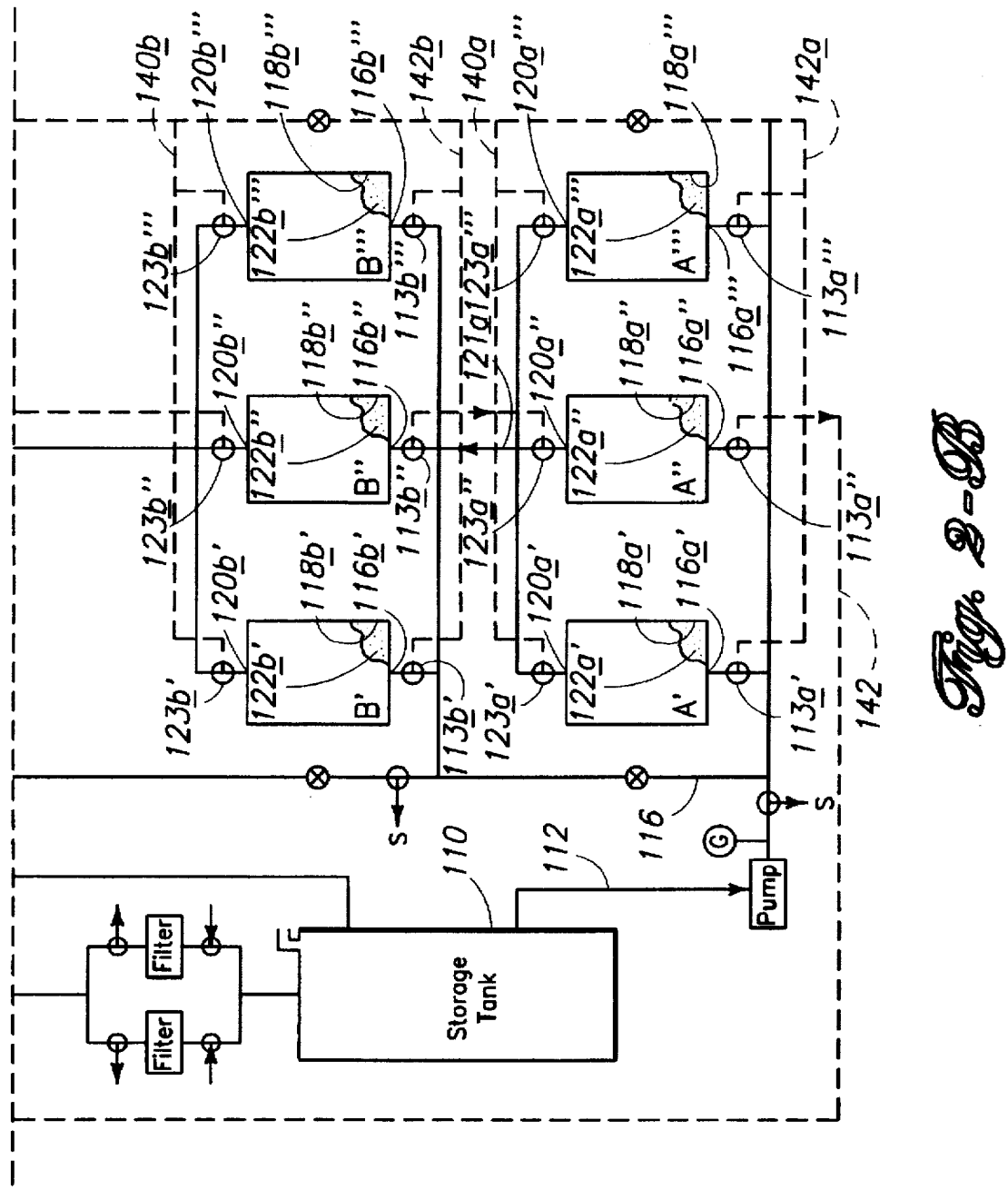
Fig. 2-B

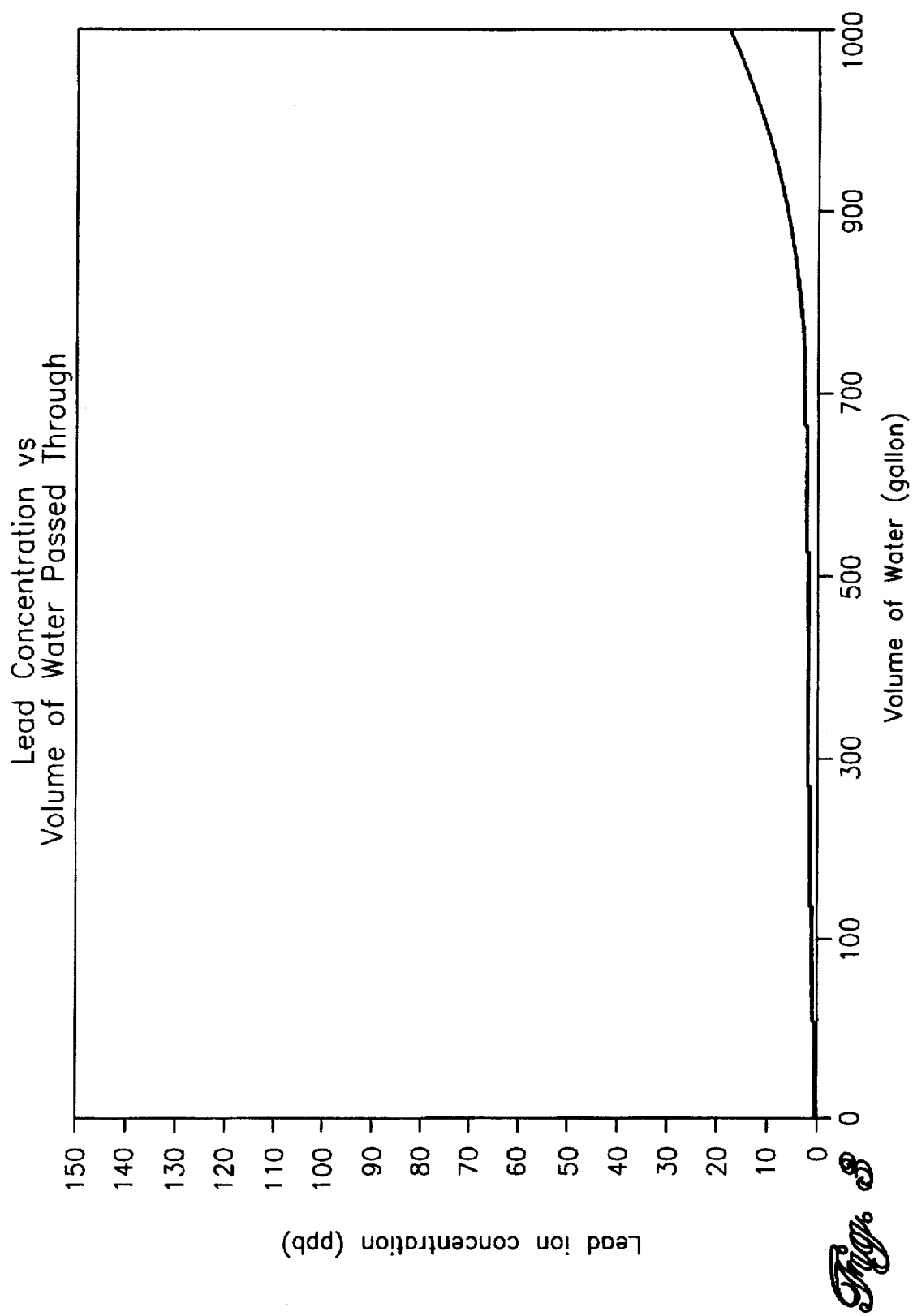

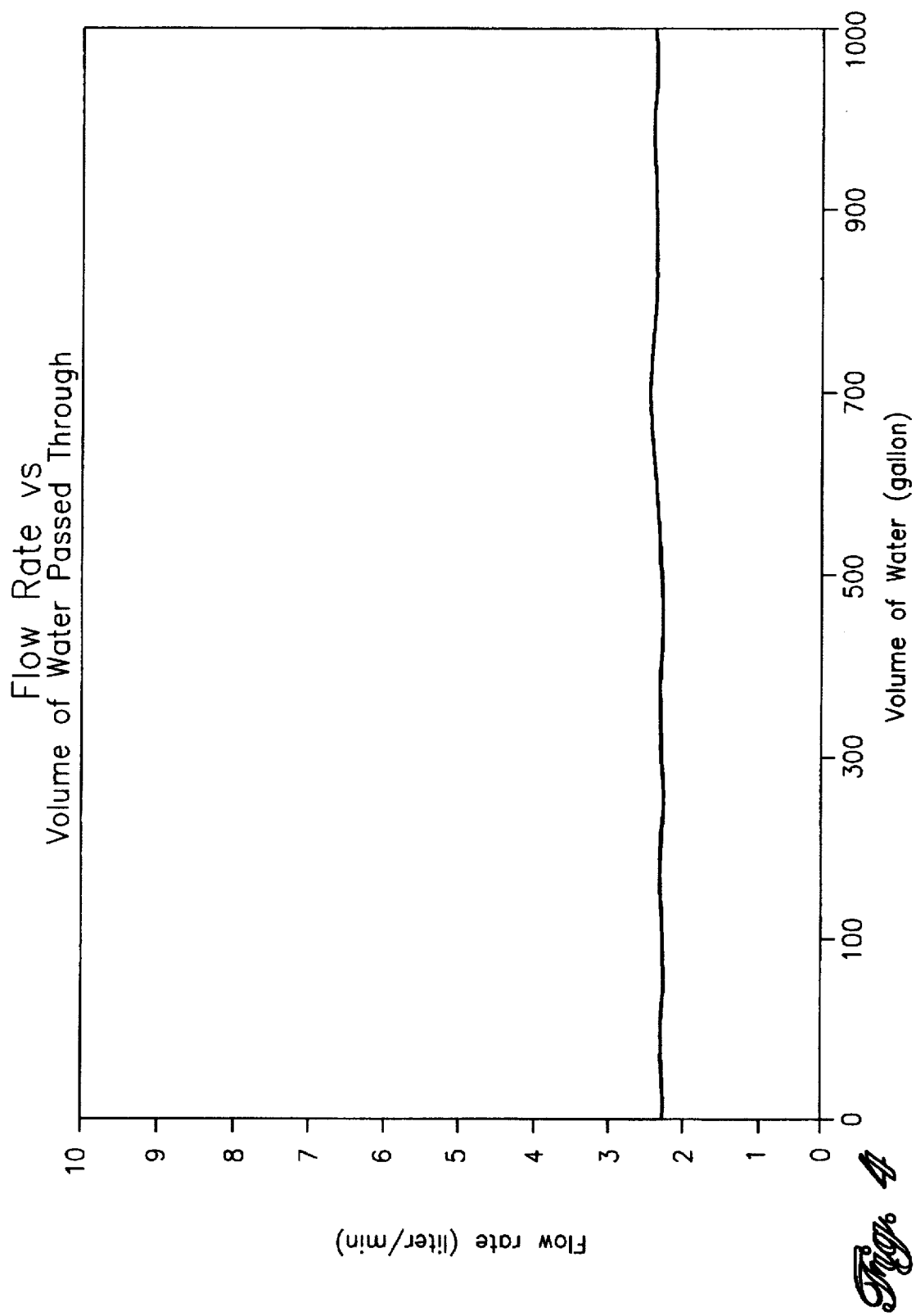

5,695,882

SYSTEM FOR EXTRACTING SOLUBLE HEAVY METALS FROM LIQUID SOLUTIONS

BACKGROUND OF THE INVENTION

1. Field of the Invention

This invention relates to systems for treating liquid solutions to remove dissolved heavy metals. More particularly, the invention relates to removing heavy metal ions and complex heavy metal ions from potable and municipal, commercial and industrial waters as well as from commercial and industrial non-aqueous waste solutions, especially in the presence of lighter metal ions commonly found in water such as calcium, magnesium and sodium ions.

2. Brief Description of the Prior Art

The initial motivation to develop such a system resulted from publicity on the adverse effect of lead in drinking water. By the late 1980's, the scientific date documented the diminished IQ performance in children with sub-clinical (asymptomatic) lead intoxication levels. This resulted in passage by the U.S. congress of the Lead Contamination Control Act of 1988. This Act targeted water supplies in the nation's schools, followed by public water systems. The Act is consistent with the national effort to remove lead from gasoline, and paint, and now water. In recent years, this effort has been extended to the control of levels of other metal contaminants, such as cadmium, mercury and other metals often found in drinking water. On the other end of the water-use spectrum, government regulations are closing in on the concentration and total amount of heavy metals allowed in municipal, commercial and industrial waste streams which reenter the environment. The tendency in regulation of industrial waste water is toward a goal of "drinking water in, drinking water out".

Workers in the field of high performance affinity liquid chromatography (HPLC) have, in recent years, developed silica packing materials for purifying mixtures produced in the biotechnology and pharmaceutical sciences. These silica packing materials exhibited high physical integrity and low non-specific binding of dissolved organic material when used for the purposes intended in high performance affinity liquid chromatography. Therefore, it seemed that use of such material for purifying potable and waste water streams might be possible. However, upon further inspection, it was realized that such chromatographic silica packing materials were susceptible to permitting the leaching of solid compounds containing the heavy metals that were bound, resulting in fouling or plugging the packing materials and release of the metals to the environment. Consequently, the leaching effects made such silica packing materials unsuitable for potable or waste water treatment applications.

SUMMARY OF THE INVENTION

The present invention provides a process for selectively removing dissolved heavy metals from liquid solutions, including potable water, industrial or effluent aqueous and non-aqueous streams, and environmental remediation of ground or surface water. In particular, the system of this invention provides a process where the selective removal of heavy metal ions and complex heavy metal ions may selectively take place in the presence of such dissolved alkaline earth metals as calcium, sodium and magnesium. In a preferred embodiment of the invention, a surface-modified silica packing material has been developed that is suitable for use in the process for treating potable and waste water in commercial quantities. This surface-modified silica packing material is easier to synthesize, uses limited organic solvents in its synthesis (which solvents can be recycled), exhibits a high heavy metal ion binding capacity with lower leaching of solid compounds and can be synthesized at considerably less cost, than silica packing materials heretofore proposed for HPLC use. Furthermore, this surface-modified silica packing material is suitable for removing certain anionic forms of metals such as chromate and arsenate, in addition to the cationic metal forms. In some forms of the invention, the process may be employed to extract valuable heavy metals from aqueous solutions, such as those solutions present in mine tailings resulting from mining methods using chemical extraction of the valuable metals.

It is a primary object of the present invention to provide a metal ion extraction system for treating liquid solutions, particularly aqueous solutions, which will selectively extract ions of dissolved heavy metals and complex heavy metals without extracting ions of dissolved alkali or alkaline earth metals. It is another object of the present invention to provide an extraction material having an activated surface suitable for use in the extraction system of this invention. Still another object of the present invention is to provide a method of compounding the activated surface of an extraction material. A further object of the present invention is to provide an extraction material with an activated surface that is suitable for use in extracting ions of dissolved heavy metals and complex heavy metals from either aqueous or non-aqueous solutions. A still further object is to provide such an extraction material that has an activated surface capable of presenting carboxy groups and sulfur groups for chelating ions of dissolved heavy metals and complex heavy metals from aqueous and non-aqueous solutions. These and other objects and advantages will become apparent from the following description of the invention and the accompanying drawings.

The process of this invention for removing ions of dissolved heavy metals and complex heavy metals comprises providing a treatment zone in which is contained an extraction material having an activated surface that has an affinity for heavy metal ions and complex heavy metal ions. The activated surface is the reaction product of a polyamine with a covalently anchored trifunctional hydrocarbyl silyl that yields non-crosslinked amino groups to which functional chelator groups Can be covalently attached. The activated surface of the extraction material is formed by first hydrating the extraction material surface and then silanizing the hydrated surface with a short chain trifunctional silane having a hydrocarbon substituent containing 1–6 carbon atoms and a terminal leaving group, and then reacting a polyamine with the hydrocarbylsilyl from the silanization of the hydrated surface so as to form an aminohydrocarbyl polymer covalently bound to the extraction material surface. The extraction material surface yields amino groups that are available for bonding to chelator groups. As thus formed, the polymer may be alkylated with a carboxyl or sulfur containing alkylating reagent on at least some of the amino groups to enhance and specialize the chelating ability of the extraction material's activated surface.

BRIEF DESCRIPTION OF THE DRAWINGS

FIGS. 2, 2A and 2B are a schematic view of another system of this invention employed to practice the process for removing heavy metal ions and complex heavy metal ions from potable and waste water supplies. FIG. 2 specifies the relationship between FIGS. 2A and 2B.

FIG. 3 depicts the lead concentration of water treated by the process of this invention vs. volume of water treated;

FIG. 4 depicts the flow rate of water treated by the process of this invention vs. volume of water treated;

DESCRIPTION OF THE PREFERRED EMBODIMENT

Figure 1:
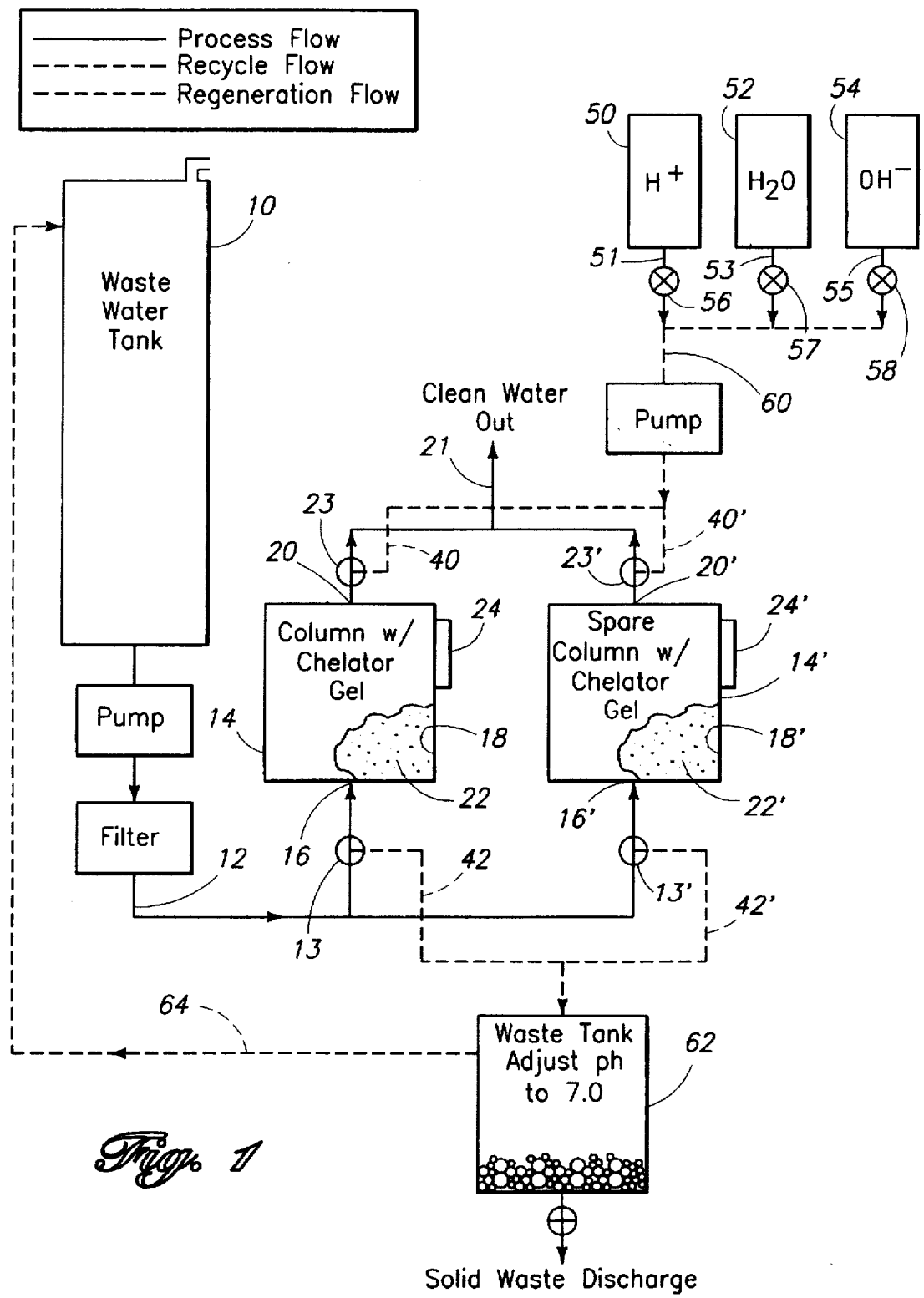
FIG. 1 is a schematic view of one system of this invention employed to practice the process for removing heavy metal ions and complex heavy metal ions from potable and waste water supplies.

The system of this invention as illustrated in FIG. 1 may be a continuous process or a batch process for extracting heavy metal ions and complex heavy metal ions from an aqueous solution, comprises a supply of treatable water, such as potable water or waste water. FIG. 1 illustrates this supply as tank 10, but the supply can be from any source that would supply a continuous stream of water. From tank 10, a continuous stream of water for treatment is directed in conduit 12 to a treatment vessel 14. Treatment vessel 14 has a contaminated water inlet 16 in fluid communication with the stream in conduit 12 and in fluid communication with a treatment zone 18 within the interior of vessel 14. Treatment vessel 14 also has a purified water outlet 20 and outlet conduit 21 in fluid communication with the treatment zone 18 within the interior to tank vessel 14. An extraction material 22 is removably located in the treatment zone 18 in such a way that a contaminated water stream from conduit 12 and inlet 16 will caused to traverse the treatment zone 18 in intimate contact with the extraction material 22, with purified water leaving the treatment zone 18 and its extraction material 22 to be discharged from the treatment vessel 14 through outlet 20. From outlet 20, the purified water will be directed to any one of a number of discharge locations, including back into the environment or to a location from which it could be recycled for reuse. The treatment zone 18 of treatment vessel 14 may be provided as an openable compartment, indicated by an openable hatch door 24, so that extraction material 22 can be loaded into the treatment zone 18 or removed therefrom as required.

The treatment vessel 14 may be provided with a purging circuit, such as the counterflow circuit shown, indicated by inlet and outlet conduits 40, 42 in fluid communication through, respectively, outlet 20 and inlet 16 with the treatment zone 18. This purging circuit may be employed to direct a purging fluid through the extraction material 22 so that the captured metal ions and complex metal ions can be recovered from the extraction material 22 so as to regenerate or reactivate the extraction material 22. Water conduits 12 and 21 may be provided with suitable valving, such as T-valves 13, 23, respectively, so that water access to the treatment zone 18 can be closed off during the extraction material purging/regenerating cycle of the system and so that purging fluid access to the treatment zone 18 can be closed off during the water treatment cycle of the system. The T-valves 13 and 23 could be controlled so that the water and purging fluid streams could not have simultaneous access to the treatment vessel 14.

Referring further to FIG. 1, the purging/regeneration cycle wherein the extraction material is purged of the captured ions and thus regenerated, a suitable purging/regeneration procedure may be as follows. The regeneration system includes an acid tank 50, a clean water tank 52 and a base tank 54, and a mixing tank 62. Tanks 50, 52 and 54 are provided, respectively, with outlet conduits 51, 53 and 55, and suitable valving such as T-valves 56, 57 and 58 that control fluid communication from the tanks to purging conduit 60 that communicates with previously-described conduits 40 and 40'. The regeneration process involves elution of the bound metal ions with acid, a chase of the residual acid with water, regeneration with base and a chase of residual base with water. Appropriate monitoring and controls and pumping systems oversee and effect the purging and regeneration steps of the process. The fluids discharged from the treatment vessels 14 or 14' are discharged through conduits 42 or 42' into the waste/mixing tank 62. The acidic and base regenerant streams and the chase stream are mixed within tank 62 and the pH of the tank is adjusted to the range of 8–10 to precipitate metal hydroxides. After the hydroxides settle out, the solid metal hydroxide is discharged and the supernate is directed back to the raw water storage tank 10 for reprocessing in conduit 64. The processed water, or a portion thereof, from conduit 21 can be directed to tank 52 to be used as the source for chase water.

A parallel treatment vessel system, indicated by the same identification numbers primed in FIG. 1, could be provided so that water treatment could continue in one treatment vessel, 14 or 14', while the other treatment vessel is being purged/regenerated or otherwise shut down such as for repair or routine maintenance.

The extraction material 22, 22' is of a type that has an activated surface with a selective affinity for the metal ion or ions to be removed by the system. The material supporting the activated surface must be solid and stable and provide a large surface area for intimate contact by the fluids which will be directed through the treatment vessel 14, 14'. A preferred support material is particulated solids, but other support material such as a matrix or web may also be employed.

A variety of particulate solids may be appropriate, such as silica gel, silica-coated particulates, other silicates, carbonates, phosphates; ceramic clays—particularly those that typically comprise silicates; inorganic pigments; various inorganic oxides—exemplary of which are titania, alumina, zirconia, beryllia and magnesium oxide; inorganic elements; and various plastics such as polymethacrylates and copolymers thereof, cross-linked and oxo functionalized polystyrene. The foregoing examples of suitable materials may compose the particulates or the particulates could be coated with such materials. Likewise, the foregoing examples of suitable materials may compose or coat the support material if provided in a non-particulate form such as a matrix or web. An important characteristic of a suitable support material, whether a particulate solid or a matrix or web or the like, is that it must be substantially incompressible so that the desired flow of water through the system will not be compromised by water pressure or flow rate.

A preferred solid particulate material is silica gel or a controlled pore glass that is chemically similar to silica. Preferred average diameters for these particulates is from about 30 microns to about 300 microns, and with pore sizes from about 60 Angstroms to about 500 Angstroms, respectively.

The surface of the extraction material 22, 22', and in particular of the preferred solid particulate material, is activated by a special chemical activation process. The activation process involves silanizing the extraction material surface, polymerizing the silanized surface, and then bonding chelating groups to the silanized and polymerized surface so that it has a specific and selective affinity for the heavy metal ion or ions which are to be extracted from the water directed into the treatment vessel 14. The process for activating the surface of the extraction material effects a covalent binding of the activated compound to the extraction material surface. The choice of the surface of the extraction material, therefore, must be chemically consistent with the particular covalent binding that must be effected to produce the activated surface required.

The surface of the extraction material is chemically treated so as to covalently bind the reaction product of a polyamine with a short chain hydrocarbyl, having a terminal leaving group, to the extraction material surface. This can be accomplished, for example, by first reacting a trifunctional silane, having a hydrocarbon substituent containing 1–6 carbon atoms and a terminal leaving group, with the surface of the extraction material in a manner such that the hydrocarbylsilyl is covalently bound with the extraction material surface, and then reacting a polyamine with the hydrocarbylsilyl so as to form an aminohydrocarbyl polymer covalently bound to the extraction material surface. The step of reacting the polyamine with the hydrocarbylsilyl must be such that it will yield multisite bound but non-crosslinked amino groups. Then, the extraction material, with the reaction product of polyamine and hydrocarbylsilyl covalently bound thereto, may be reacted with a chelator so as to covalently bind additional ligating groups to the amino groups. The extraction material surface yields multiple amino and imino groups that are available for bonding to chelator groups. As thus formed, the polymer may be alkylated with a carboxyl or sulfur containing alkylating reagent on at least some of the amino groups to enhance and specialize the chelating ability of the extraction material's activated surface. The resulting chelator, of course, must be selected to provide functional groups that have the specific and selective affinity for the heavy metal ions and complex heavy metal ions for which extraction is sought. The trifunctional leaving groups provide sites for covalently bonding the hydrocarbylsilyl to the surface of the extraction material through Si—O bonds. The terminal leaving groups provide sites for covalently bonding the polyamine to the hydrocarbylsilyl through Si—hydrocarbyl bonds.

In a process for treating aqueous solutions particularly, it would be desirable to purge the extraction material of the chelated metal or complex metal ions and recycle the regenerated extraction material for reuse. This could be accomplished by providing parallel treatment systems as shown in FIG. 1. Alternately, spent extraction material could be removed from a treatment vessel, regenerated, and then recharged to the treatment system. An appropriate regeneration sequence could be as follows.

The sequence of formulating the activated extraction material surface has some critical components. First of all, the extraction material surface must be covered with a monolayer of water. This can be conveniently accomplished by rigorously cleaning the surface with nitric acid, drying and then rehydrating the surface to insure that a monolayer of water overlays the surface. Second, the clean and hydrated surface must be silanized before the polyamine is brought into the reaction. Polyamine addition is commenced only after the silanization procedure has been completed. By silanizing the hydrated surface with a silane having a short chain hydrocarbyl substituent containing 1–6 carbon atoms and a terminal leaving group, the surface of the extraction material will be virtually completely covered by Srf—O—Si—hydrocarbyl groups, where Srf represents the extraction material surface, and by lateral Si—O—Si bonds. The result is a horizontally polymerized extraction material surface, covalently bound to the surface by Si—O bonds and cross-linked by Si—O—Si bonds with essentially few or no —OH groups left unreacted on the extraction material's surface. The short hydrocarbyl chains extend from hydrocarbylsilyl groups and not from the extraction material surface, and are not themselves cross-linked. As a consequence, of this form of silanization, the hydrocarbylated extraction material surface becomes hydrolytically stable in both high and low pH solutions. Polyamine addition to the cross-linked, silanized surface, results in the substitution of amino groups onto the ends of short hydrocarbyl chains without destabilizing either the extraction material surface or the covalent bonds with the hydrocarbyl substituent. In the context of a preferred activating process, employing a short chain trifunctional alkyl silane containing 1–6 carbon atoms, such as trichloropropylsilane, the result is a densely alkylated extraction material surface, which is optimal for bonding amino groups and for addition of functionalizing groups.

The foregoing steps are illustrated by the following Schema, which will now be discussed in greater detail.

Scheme 1

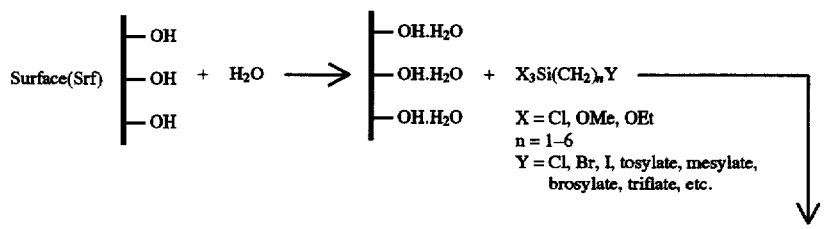

-continued
Scheme 1

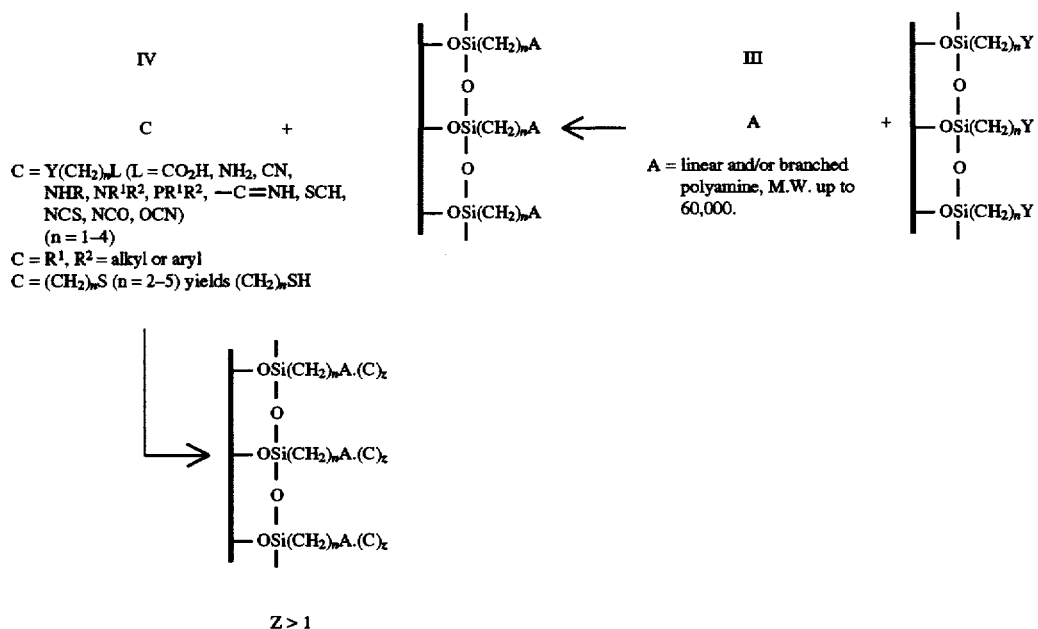

In the activation process of the Schema, the surface of the extraction material is chemically treated so as to covalently bind the reaction product of a polyamine with a hydrocarbylsilyl, such as the preferred haloalkylsilyl, to the extraction material surface. This can be accomplished, for example, by first reacting a short chain trifunctional silane having a hydrocarbon substituent containing 1–6 carbon atoms and a terminal leaving group, such as a haloalkyl trifunctional silane, with the surface of the extraction material in a manner such that the hydrocarbylsilyl is covalently bound with the extraction material surface, and then reacting a polyamine such as polyethyleneimine with the hydrocarbylsilyl to bind the polyamine to the hydrocarbylsilyl. The step of reacting the polyamine with the hydrocarbylsilyl must be such that it will yield multisite bound but non-crosslinked amino groups.

The preferred activation process of this invention, produces a hydrolytically stable activated surface on the extraction material. This hydrolytically stable activated surface enables the use of the extraction material in high and low pH solutions (10 to 4) with high extraction selectivity and with minimal deterioration of the extraction material or its activated surface. To achieve this hydrolytically stable activated surface, the alkylation of the extraction material surface is preceded by the steps of thoroughly cleaning and hydrating the surface of the extraction material( Schema I). The extraction material surface may be cleaned by applying boiling nitric acid to the surface and then washing the surface with pure water. The extraction material surface may be hydrated by applying a moisturized atmosphere, such as air passed through saturated sodium bromide, to the surface in a controlled environment until a predetermined humidification has been attained.

Then, the hydrated extraction material surface is contacted with the above-defined short chain trifunctional silane, such as a haloalkyl trifunctional silane, in the presence of an inert organic solvent (Schema II). The reaction between the hydrated surface of the extraction material and the silane produces a hydrocarbylsilyl that is covalently bonded to the extraction material surface by siloxanyl (Si—O) groups. After the reaction between the hydrated surface and the silane, the extraction material surface is rinsed with an inert organic solvent and dried.

Then, the silanated and dried extraction material surface is contacted with polyamine in the presence of an inert organic solvent or water to react the polyamine with the hydrocarbylsilyl to produce a non-crosslinked aminohydrocarbylsilyl polymer (Schema III).

The non-crosslinked hydrocarbylsilyl polymer yields non-crosslinked amino groups for reaction with a ligator. One or more ligators may be reacted with the aminoalkylsilyl polymer to produce covalently bonded chelator groups having the desired selective and specific heavy metal ion affinities. The activation process may be modified by alkylating the aminohydrocarbylsilyl polymer to produce functional reaction groups in addition to the amino groups (Schema IV). For example, carboxyl containing derivatives of the aminohydrocarbylsilyl polymer are especially suited for extracting heavy metal divalent cations which can be later removed in concentrated form using dilute mineral acids. Another modification to the aminoalkylsilyl polymer may be made by reacting a cyclic sulfide with the amino groups to produce thiol groups, in addition to the amino groups and, if present, the hydrocarbylcarboxyl groups. The sulfur groups have a natural tendency to coordinate the capture of heavier metals, including lead, so as to effect almost irreversible binding of those metal ions and complex metal ions. Since there is no specific chemical composition along the polymer chain, there will exist a range of amino groups, sulfur groups, or amino and hydrocarbylcarboxyl groups along the chain in the above examples.

Suitable trifunctional groups for the silanizing agent include trichloro, trimethoxy and triethoxy groups (Schema II); trichloro being preferred. Suitable groups for the silanizing agent include bromine, chlorine and iodine, tosylate, mesylate, brosylate and triflate (Schema II); bromine being preferred. Suitable hydrocarbyl substituents include short chain aliphatic hydrocarbons having 1–6 carbon atoms (Schema II); alkyl being preferred—and, more particularly, propyl being most preferred, based on pricing of the trichlorosilyl halide. A preferred M.W. range for the polyamine is about 1200–1800; with polyethyleneimine in that range being most preferred.

Suitable chelating functional groups for heavy metal ion and heavy metal complex ion extraction (Schema IV) include:

TABLE I

| Functional Group | Metal or Complex Metal Ions |
| --- | --- |
| —COOH | heavy metal divalent and trivalent ions |
| —SH | heavy metal divalent and trivalent ions |
| —CN | heavy metal divalent and trivalent ions |
| —$NH_2$ | $Ag^+$, anionic at pH < 4 |
| —NHR | trivalent heavy metal ($Fe^{3+}$) |
| —$NHR_1R_2$ | trivalent heavy metal ($Fe^{3+}$) |
| —C≡NH | trivalent heavy metal ($Fe^{3+}$) |
| —$PR_1R_2$ | low valent heavy metals, $Rh^+$, $La^{3+}$, $Pd^{3+}$ organometallics |
| —SCN | general |
| —NCS | $Ni^{2+}$ |
| —NCO | general |
| —OCN | low valent $Rh^{2+}$, $Ru^{2+}$ |

"Heavy metal" as used in the above table and as used throughout herein excludes all alkaline and alkaline earth metals and includes the transition elements and the elements of the lanthanide and actinide series in the Periodic Table, as well as aluminum, tin, lead, titanium, and metalloids such as arsenic and selenium. "Heavy metal ions" as used in the above table and as used throughout herein refers to free metal ions. "Complex heavy metal ions" as used in the above table and as used throughout herein refers to metal groups in anionic and cationic form.

A preferred extraction material activated surface comprises an alkylated silica gel where the silica gel surface is first reacted with a haloalkytrichlorosilane and, then, that reaction product is further reacted with polyethyleneimine to yield a polyethyleneiminoalkylsilyl activated surface. As discussed previously herein, any number of suitable support materials may be substituted in place of the silica gel for use as an extraction material; silica gel merely being preferred because of its availability in sizes particularly suitable for use in continuous-flow extraction processes.

Exemplary of the preparation of such a polyethyleneimino-alkylsilyl-activated surface on silica gel is the following Example:

Step 1. Cleansing of the silica gel with nitric acid

Raw silica gel (such as Crosfield, 200 g, 105 micron) is mixed with 1N nitric acid (800 ml) in a 2 liter three-necked round bottom flask. The contents is degassed for two minutes. After degassing, the flask is put into a heating well and a reflux condenser, a thermometer and a mechanical stirrer is attached to the flask. The contents of the flask is stirred and heated at 100 degrees for 6 hours. At the end of the 6 hour heating, the contents is cooled to room temperature and dumped into a 3 liter sintered glass funnel. The gel is washed with deionized water three times with 800 ml each. The gel is further washed with methanol three times with 800 ml each. After most of the methanol is removed, the gel is spread in an open pan and air dried overnight. The air-dried gel in the pan is placed in an oven and dried at 120 degrees for 2–4 hours until constant weight is reached. Typical weight lost during this acid wash is about 6.4–7.1%.

Step 2. Hydration of the gel

Next, the oven-dried gel (200 g) is placed in a 3 liter sintered glass funnel. Moisturized air from a saturated solution of sodium bromide is passed through the gel from the outlet of the funnel. The flow rate of the moisturized air is regulated so that a fountain-like motion of the gel is observed. During this step, the weight of gel is checked every two hours until constant weight is obtained. Typical time required is about 12–16 hours and the average weight gain is 4.2–4.6%.

Step 3. Addition of bromopropyltrichloro silane

Then, the hydrated gel (200 g) is placed in a 2 liter single-necked round bottomed flask. Heptane (704.9 ml, dried over a molecular sieve) and bromopropyltrichloro silane (951 ml, freshly distilled) are well mixed in a 1 liter erlenmeyer flask and then slowly poured into the round bottom flask via a funnel. Hydrochloric gas forms vigorously and the contents is gently swirled to let more hydrochloric gas evolve. After most of the gas evolution subsides, the flask is attached to a mechanical vacuum pump and degassed for 5 minutes. At the end of the 5 minutes, the flask is attached to a mechanical motor and spun slowly for 16 hours. After 16 hours of spinning, the contents is poured into a 3 liter sintered glass funnel and the gel is washed successively with heptane three times, methanol three times, water three times and finally methanol three times with 800 ml each the gel is air dried in an open pan and then in the oven at 110 degrees for 2 hours. Typical weight gain is about 30.4–32.5%.

Step 4. Polyethyleneimine addition

Next, polyethyleneimine (PEI), molecular weight 1200, (300 g), distilled water (100 ml) and methanol (300 ml) is mixed in a 1 liter erlenmeyer flask. The bromopropyl gel (200 g) from step 3 is placed in a 2 liter single-necked round bottomed flask and the PEI/water/methanol solution is poured into this flask. The contents is swirled and degassed with a mechanical vacuum pump for 5 minutes. After the degassing process, the flask is attached to a motor and spun at room temperature for 2 hours. At the end of the 2 hours, the contents is poured into a 3 liter sintered glass funnel and washed with water three times, 1N sulfuric acid one time, water ten times, 1N ammonium hydroxide one time, water ten times and finally methanol three times. The gel is air dried in an open pan.

To the silica gel activated surface formed by the above four-step process, the activated surface may be further treated as follows:

Step 5. Bromoacetic acid addition

Sodium hydroxide (12 g) is dissolved in deionized water (800 ml) in a 1 liter erlenmeyer flask. Bromoacetic acid (41 g) is dissolved in the sodium hydroxide solution. PEI gel from step 4 is placed into a 2 liter round bottomed flask and the bromoacetic acid/sodium hydroxide solution is added into the round bottomed flask. The solution is degassed with a mechanical vacuum pump for 5 minutes. After degassing, the flask is attached to a motor and spun for 16 hours. At the end of 16 hours, the gel is poured into a 3 liter sintered glass funnel and washed with deionized water three times, 1N sulfuric acid one time, deionized water three times, 1N ammonium hydroxide one time, deionized water three times and finally with methanol three times, with 800 ml each. The gel is air dried in an open pan.

Step 6. Addition of ethylene sulfide to PEI gel

Polyethyleneimine gel (200 g), dried under vacuum for 2 hours, and MeOH (800 ml) are added into a 2 liter three-necked round bottomed flask. The contents is degassed for 5 minutes with a mechanical vacuum pump. After 5 minutes of degassing, the flask is put in a heating well and a mechanical stirrer. While stirring, the contents is heated to reflux. While refluxing, ethylene sulfide (21.6 ml) is added dropwise over twenty minutes. The contents is maintained at 65° C. for 16 hours and then brought to room temperature and poured into a 3 liter sintered glass funnel and washed with 800 ml each of methanol three times, deionized water three times, 1N ammonium hydroxide one time, deionized water three times and finally methanol three times. The gel is dried in an open pan.

The silica gel, with its surface activated as described in the foregoing 6 steps, was tested as follows:

Step 7. lead ion capture experiment

Regular tap water was used to fill a 55+ gallon plastic settling container to the 50 gallon mark. A measured amount of lead chloride concentrated solution was added to make a lead ion concentration of 150 ppb. this solution was then transferred into another plastic container of equal size. The PEI-BAA gel from step 6 (38 g) was packed into a plastic column with 4, 5 cm length and 5.0 cm diameter. The lead ion-spiked water was passed through the column at 30 psi and the flow-through was sampled and the flow rate measured until 1000 gallons of a the spiked water was passed through. The lead ion concentration of the water after passing through the column is shown in FIG. 3. The flow rate of water passing through the column is shown in FIG. 4.

In the foregoing example, the trichloro substituent provides trifunctional leaving groups for binding the propylsilyl to the hydrated gel of step 2 by covalent bonding through Si—O groups, HCL gas being formed in the reaction. If, instead, a trimethoxy substituent were present to provide the trifunctional leaving groups, free methanol would be formed. Any trifunctional substituent providing leaving groups for binding propylsilyl to the extraction material surface by O—Si—Pr bonds would be suitable. And, more generally, any trifunctional substituent providing leaving points for binding alkysilyl to the extraction material surface by O—Si—Alkyl bonds would be suitable where the hydrocarbon substituent contains 1–6 carbon atoms. Suitable trifunctional substituents include trichloro, trimethoxy and triethoxy substituents.

In the foregoing example, the bromo substituent provides leaving groups for binding the polyethyleneimine to the propylsilyl of the alkylated gel of step 3 by covalent bonding through Si—Pr, free hydrogen bromide being formed in the reaction. If, instead, a chloro substituent were present to provide the leaving groups, hydrogen chloride would be formed. Any leaving group providing sites for binding propylsilyl to the PEI by Si—Pr—PEI bonds would be suitable. And, more generally, any halogen substituent providing leaving points for binding alkysilyl to polyamines in a Si—Alkyl—Polyamine bonds would be suitable where the hydrocarbon substituent contains 1–6 carbon atoms or an aromatic nucleus. Any of the halogens are suitable substituents, as are tosylate and mesylate.

Functionalizing the PEI gel in step 5 is desirable to convert the PEI gel to a form with higher binding affinity toward metal ions. The purpose of functionalizing the PEI gel is to react with amino groups to yield capture points for cationic materials. In addition to bromoacetic acid, other carboxyic acids and carboxylic acid anhydrides would be suitable. For example, if the halogen substituent of the haloalkylsilyl were chlorine, an appropriate alkylating group would be chloroacetic acid. Other suitable carboxylating agents include dibasic acid anhydrides such as succinic acid anhydride, glutaric acid anhydride, diglycolic acid anhydride and the like. Where metal anions are present in the stream to be treated, such as metal oxo anions, the type or degree of functionalizing may be controlled so that imino and amino groups remain unreacted, or the functionalizing step may be eliminated altogether.

The ethylene sulfide substitution of step 6 enhances the binding strength of the extraction material's activated surface in that metal ions and complex metal ions are bound much tighter in the presence of sulfur. Other cyclic organic sulfur compounds, such as thietane or tetrahydrothiophene, would be suitable, also. The organic sulfur compound reacts with the imino and amino groups of PEI gel and, therefore, there must be a balancing of steps 5 and 6 so that the desired degrees of the various functionalizations can be achieved.

Extraction processes for which the activated surface extraction material described herein can be used, in addition to continuous process water treatment—such as the process shown in FIG. 1, include continuous and batch processes for extracting metals from organic solvent solutions, batch processes for extracting precious metals from aqueous solutions, and the like. Depending on economic factors, the extraction material may be recycled as shown in FIG. 1 or it may be discarded after use. In addition to the packed bed process shown in FIG. 1, continuous or batch processes may be conducted in fluidized bed configurations, also.

Figure 2:
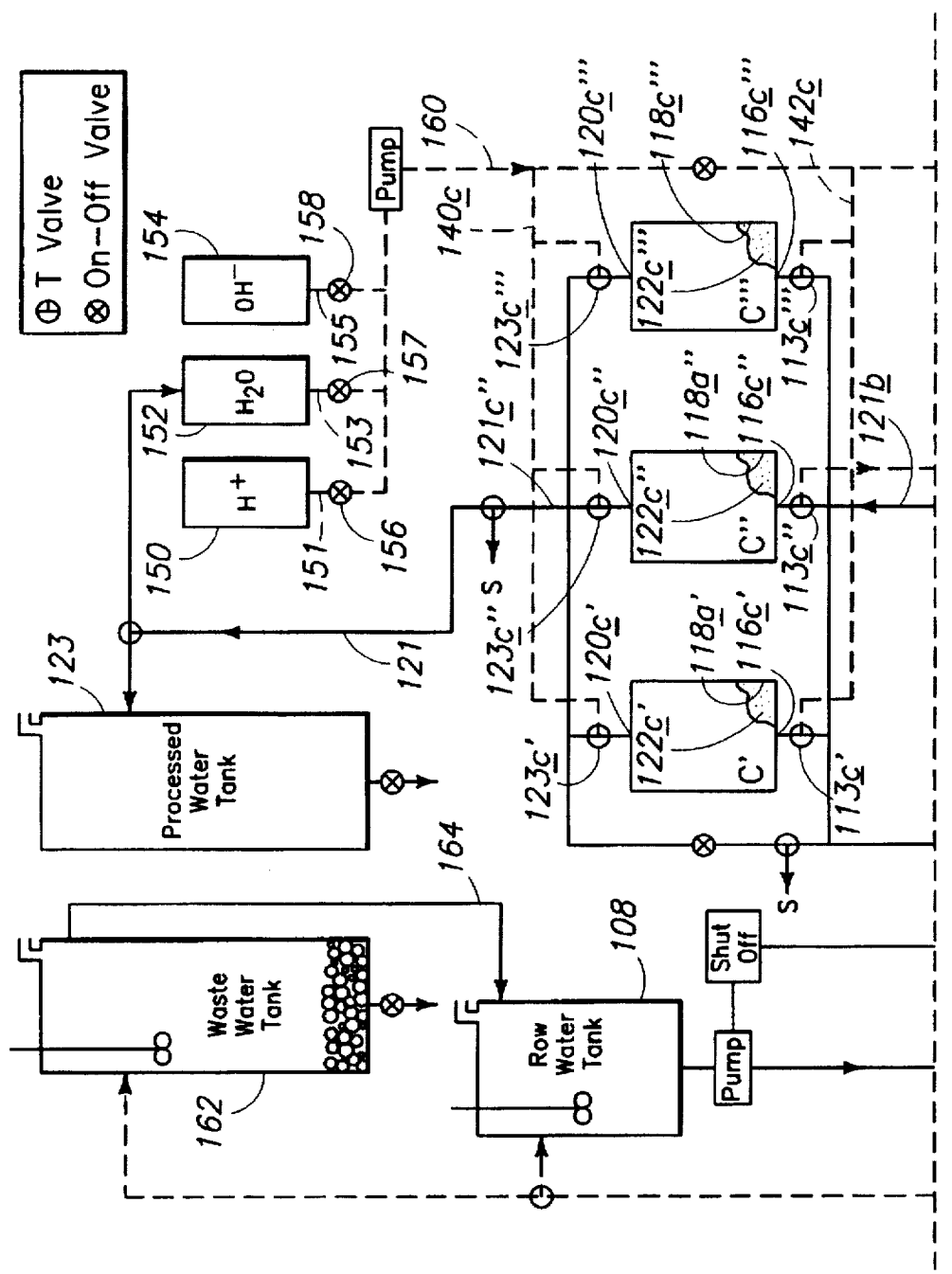

FIG. 2 illustrates a more complex, multi-stage process for extracting heavy metal ions and complex heavy metal ions from an aqueous solution. In this system, a raw water tank 108 supplies treatable water to storage tank 110. From tank 10, a continuous stream of water for treatment is directed in conduit 112 to one or more treatment vessels A', A", A'", or B', B", B'", or C', C", C'". Three sets of vessels A, B and C provide a parallel treatment vessel system, indicated by the same identification letters primed, double-primed and triple-primed, so that water treatment can continue in one or more vessels of each set while the other(s) are being purged/regenerated or otherwise shut down such as for repair or routine maintenance. Three sets of vessels are provided in this system so that three different forms of the hydrocarbylated extraction material may be utilized to maximize the extraction process; one form being contained in vessels A', A" and A'", a second form being contained in vessels B', B" and B'", and a third form being contained in vessels C', C" and C'". Routing of the treatable water to one or more of the treatment vessels is controlled by appropriate on-off valves (indicated by encircled X's) and T-valves (indicated by encircled T's), with appropriate sampling valves (marked S←) located to permit sampling the content of the water as in undergoes treatment through the various sets of vessels. Appropriate monitoring and controls and pumping systems oversee and effect the steps of the process.

Raw treatable water from tank 108 is appropriately filtered and supplied to storage tank 110 and then is directed into the process vessels through conduit 112 and common supply conduit 116. The treatment vessels have contaminated water inlets 116A', 116A", 116A'", 116B', 116B", 116b'", 116C', 116C" and 116C'" in fluid communication with common supply conduit 116 so that the stream in conduit 112 can be directed to any one or more of the vessels. Each water inlet is in fluid communication with a treatment zone within the interior of its vessel 118A', 118A", 118A'", 118B', 118B", 118b'", 118C', 118C" and 118C'". Each treatment vessel also has a purified water outlet 120A', 120A", 120A'", 120B', 120B", 120b'", 120C', 120C" and 120C'" and outlet conduit 121A', 121A", 121A'", 121B', 121B", 121b'", 121C', 121C" and 121C'" in fluid communication with its respective treatment zone within the interior of its vessel. A first form of hydrocarbylated extraction material 122A', 122A", 122A'" is located in the treatment zones of the vessels of set A; a second form of hydrocarbylated extraction material 122B', 122B", 122b'" is located in the treatment zones of the vessels of set B; and a third form of hydrocarbylated extraction material 122C', 122C" and 122C'" is located in the treatment zones of the vessels of set C in such a way that a contaminated water stream from conduit 112 and supply conduit 116 will caused to traverse the desired treatment zone in intimate contact with the hydrocarbylated extraction material. From the treatment vessel outlets, the water stream will be directed to one of the other vessel sets or to any one of a number of discharge locations, including back into the environment or to a location from which it could be recycled for reuse. The treatment vessels of sets A, B and C are in series communication so that a water stream can pass directly from an A vessel through conduit 121A to a B vessel and then to a C vessel through conduit 121B before being directed in conduit 121 to a processed water holding tank 123.

The hydrocarbylated extraction material 122A', 122A" and 122A'" may take the form of an aminohydrocarbyl polymer covalently bound to the extraction material surface where the amino groups are not bonded to ligators. For example, the hydrocarbylated extraction material within the set A treatment zones may be provided in the form of a polyethyleneiminoalkylsilyl activated-surface extraction material formulated in accordance with the parameters set forth in the preceding sections herein. The hydrocarbylated extraction material 122B', 122B" and 122B'" in the set B treatment zones may take the form of an aminohydrocarbyl polymer covalently bound to the extraction material surface where the amino groups are reacted with a ligator to provide hydrocarbylcarboxyl groups in addition to the amino groups. The hydrocarbylated extraction material 122C', 122C" and 122C'" in the set C treatment zones may take the form of an aminohydrocarbyl polymer covalently bound to the extraction material surface where the amino groups are reacted with a ligator to provide thiol groups in addition to the amino groups.

By providing three forms of the hydrocarbylated extraction material, three increasingly effective stages of metal ion removal can be provided. The system of FIG. 2 would be especially suited for extracting heavy metals from acid mine waste water. The first stage in the set A treatment zones provides amino groups for binding positively charged heavy metal ions and complex heavy metal ions, such as cadmium and chromate, and negatively charged oxy-anions at pH<4. The second stage in the set B treatment zones provides carboxyl groups to selectively bind heavy metal divalent and trivalent ions, in addition to other heavy metal ions and complex heavy metal ions. The third stage in the set C treatment zones provides thiol groups to selectively bind heavy metal ions and complex heavy metal ions, such as the extremely toxic ions of cadmium, mercury and lead, with an extremely high binding constant effecting removal from the ppb range to the sub-ppb range.

Figure 5:
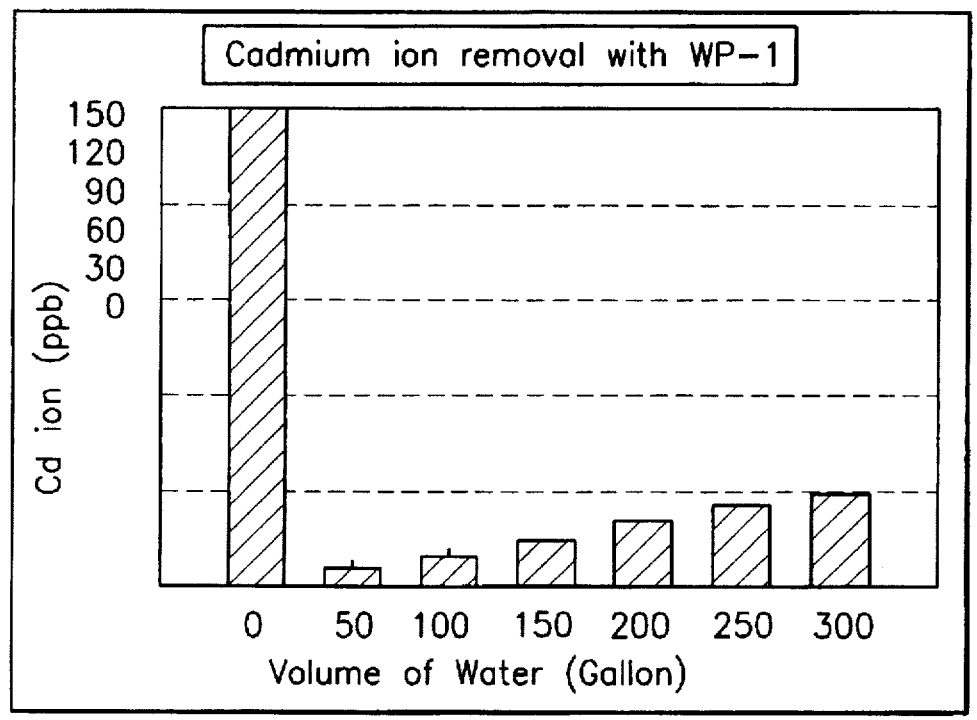
FIG. 5 depicts cadmium ion removal with a first form of the hydrocarbylated extraction material provided by this invention.
Figure 6:
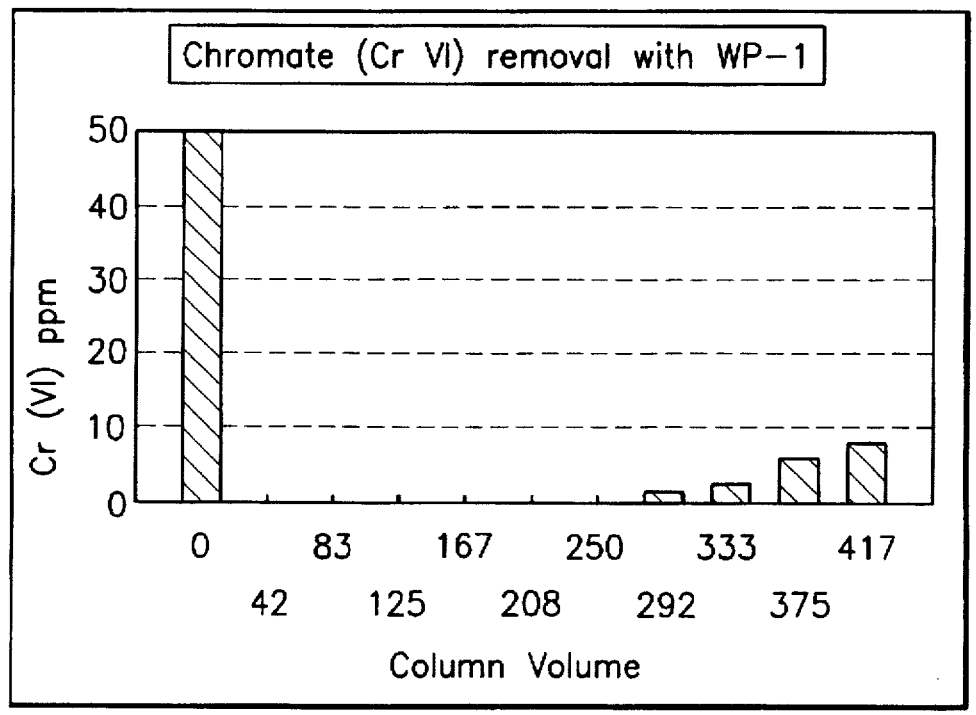
FIG. 6 depicts chromate ion removal with the first form of the hydrocarbylated extraction material provided by this invention.

FIGS. 5 and 6 illustrate the application of the set A hydrocarbylated extraction material to remove cadmium ions and chromate ions, respectively. In these illustrations, the set A activated extraction material was compounded in accordance with the above-described Example, Steps 1–4. The resultant polyethyleneiminoalkylsilyl activated surface was de-protonated to insure the presence of $NH_2$ group and 45.0 g was packed into a column with a diameter of 5.0 cm and a length of 5.0 cm. For the results illustrated in FIG. 5, regular tap water was spiked with cadmium ions at 150 ppb, and pumped through the column at 30 psi and a flow rate of 0.5 gal/min; the cadmium concentration of the processed water collected from the column outlet being determined by AA, and the results shown in FIG. 5. For the results illustrated in FIG. 6, de-ionized water was spiked with 50.0 ppm of Cr(VI), as chromate, and pumped through the column at 48 ml/min (or 20 column volumes per min); the chromate concentration of the processed water collected from the column outlet being determined by AA, and the results shown in FIG. 6. This hydrocarbylated extraction material is suitable for removing heavy metal ions and complex heavy metal ions from contaminated water from ppm range to less than one ppm, and for recovering precious metals.

Figure 7:
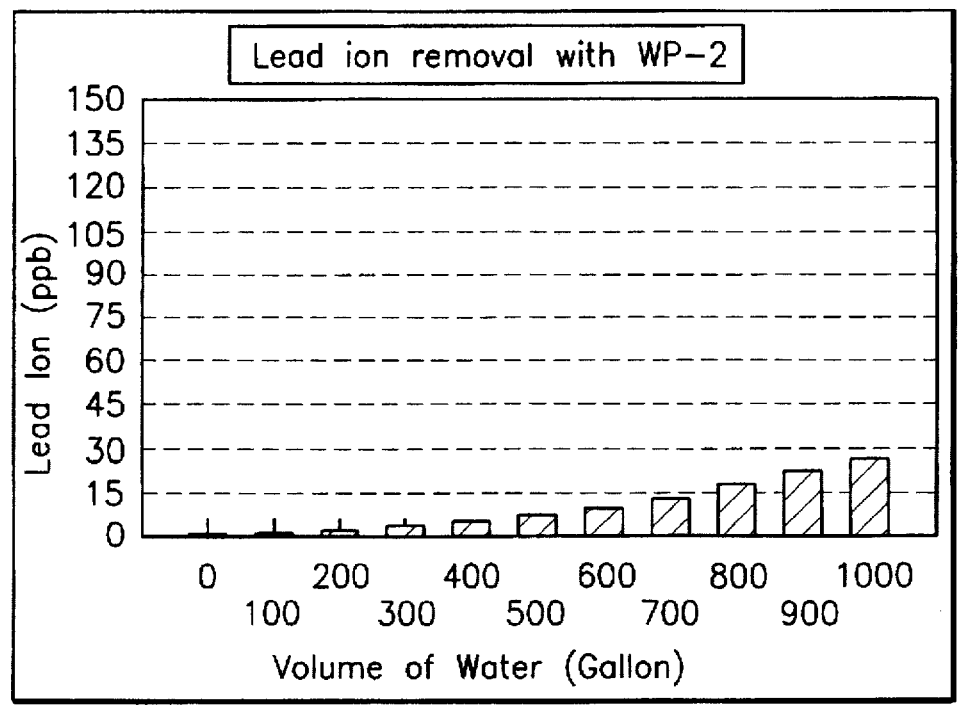
FIG. 7 depicts lead ion removal with a second form of the hydrocarbylated extraction material provided by this invention.
Figure 8:
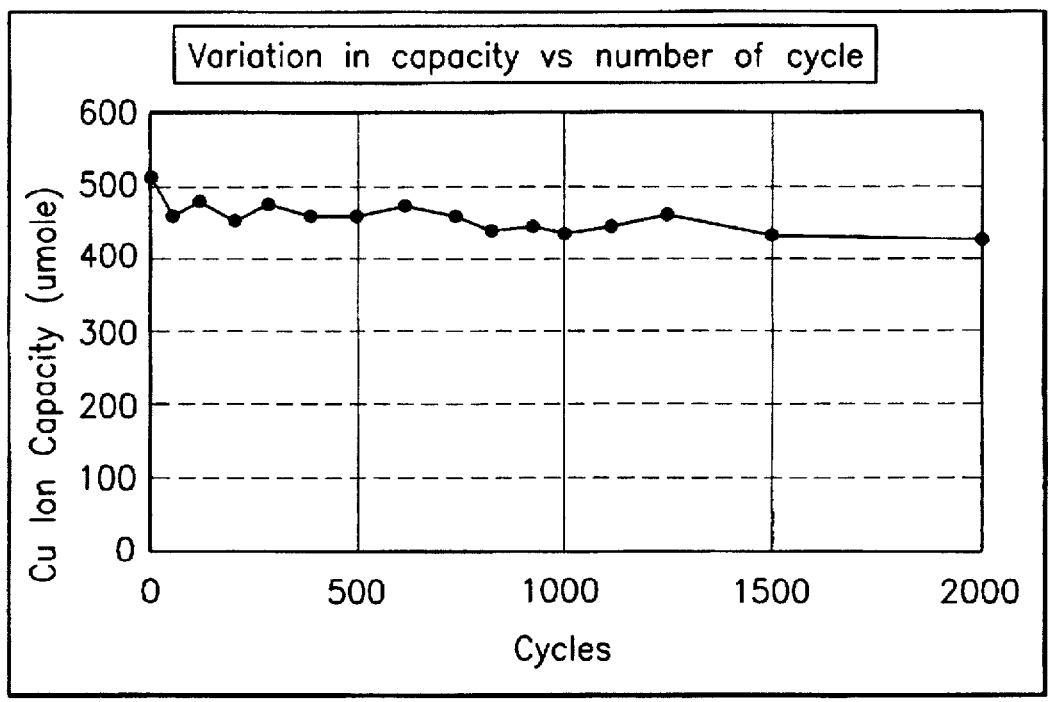
FIG. 8 depicts the variation in ion removal capacity vs. the number of cycles that one form of the hydrocarbylated extraction material provided by this invention is used.

FIGS. 7 and 8 illustrate the application of the set B hydrocarbylated extraction material, including hydrocarbylcarboxyl chelating groups, to remove cadmium ions and chromate ions, respectively. In these illustrations, the set B activated extraction material was compounded in accordance with the above-described Example, Steps 1–5. The carboxyl functional group enables the binding of heavy metal ions more effectively than it binds calcium, magnesium and sodium ions. Because of this property, the set B activated extraction material can be used to "polish" water contaminated with low levels of toxic heavy metal ions; thus reducing them to an extremely low level, and resulting in water that is not toxic according to EPA regulations. Consequently, treating water with the set B activated extraction material is especially suitable after gross removal of heavy metal ions in the set A treatment stage. Using the same column and column packing density as in FIGS. 5 and 6, tap water spiked with lead ions to 150 ppb was pumped through the column at 30 psi with a flow rate of 0.5 gal/min; the processed water sampled and the lead ion content determined by AA, and the results shown in FIG. 7. The set B hydrocarbylated extraction material allows for multiple regeneration with great gel stability. In FIG. 8, a column with 2.4 ml of the set B hydrocarbylated extraction material compounded in accordance with the above-described Example, Steps 1–5, was saturated with 50 mM of copper solution followed by acid elution of the bound copper ion and regeneration with base. After the indicated number of cycles, the capacity of the column was measured and the results plotted. This hydrocarbylated extraction material is suited to industrial removal of heavy metal ions and complex heavy metal ions in continuous processes where multiple recycling of the gel and/or metal ion concentration is desired.

Figure 9:
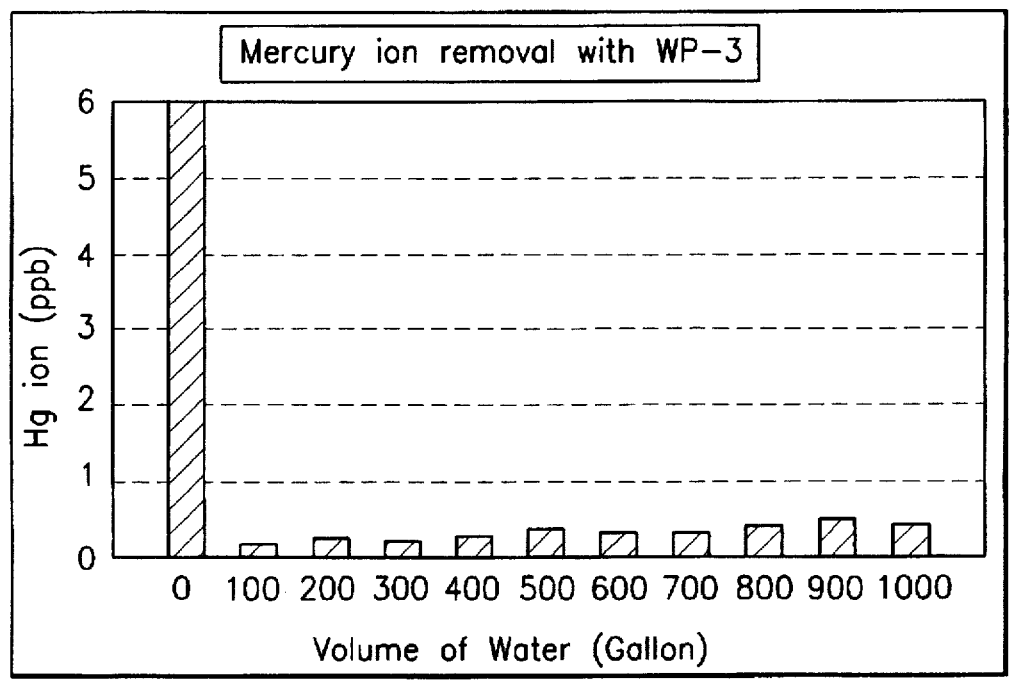
FIG. 9 depicts mercury ion removal with a third form of the hydrocarbylated extraction material provided by this invention.
Figure 10:
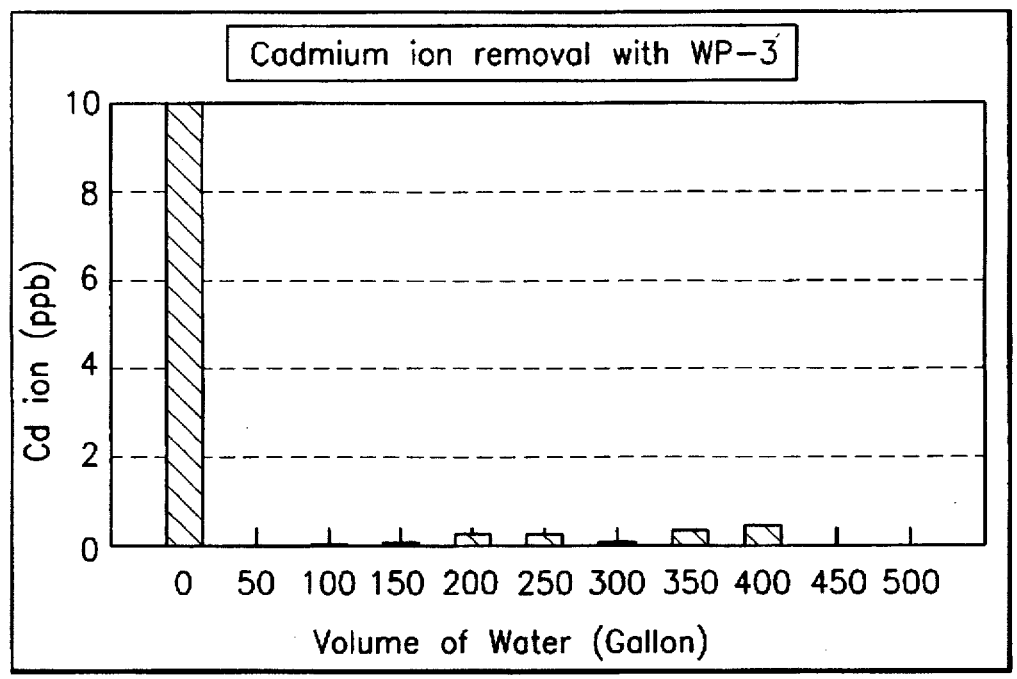
FIG. 10 depicts cadmium ion removal with the third form of the hydrocarbylated extraction material provided by this invention.
Figure 11:
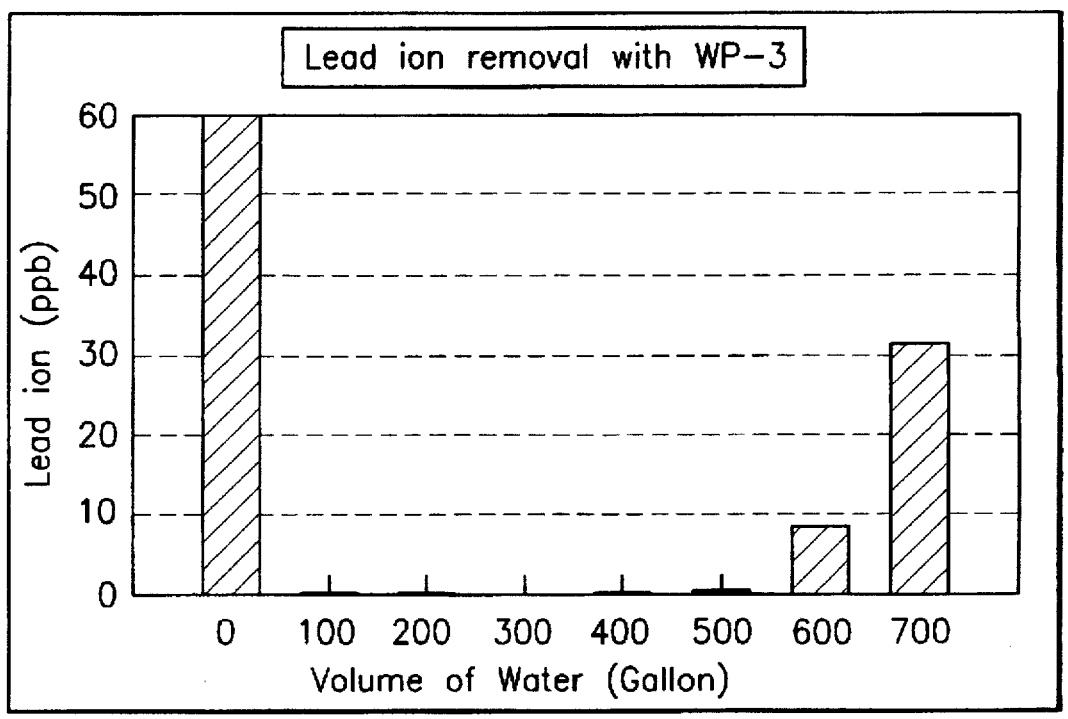
FIG. 11 depicts lead ion removal with the third form of the hydrocarbylated extraction material provided by this invention.

FIGS. 9, 10 and 11 illustrate the application of the set C hydrocarbylated extraction material, including thiol groups, to remove mercury ions, cadmium ions and lead ions, respectively. In these illustrations, the set C activated extraction material was compounded in accordance with the above-described Example, Steps 1–6. Using the same column and column packing density as in FIGS. 5 and 6, tap water spiked with $HgCl_2$, $CdCl_2$ and $PbCl_2$, respectively, was pumped through the column at 30 psi with a flow rate of 0.5 gal/min; the processed water sampled and the metal ion content determined by AA, the results shown, respectively, in FIGS. 9, 10 and 11. The set C hydrocarbylated extraction material is suitable for point-of-use drinking water metal ion removal. This material offers the advantage of very low leaching rates and excellent stability.

Referring further to FIG. 2, the treatment vessels may be provided with a purging circuit, such as the counterflow circuit shown, indicated by inlet and outlet conduits 140A, 140B and 140C, and 142A, 142B and 142C, respectively, in fluid communication through, respectively, treatment vessel outlets 120A, 120B and 120C and treatment vessel inlets 116A, 116B and 116C with the vessel treatment zones. This purging circuit may be employed to direct a purging fluid through the various extraction materials 122A, 122B and 122C so that the captured metal ions and complex metal ions can be recovered from the extraction material and so that the extraction material can be regenerated or reactivated. Water conduits 112 and 121 may be provided with suitable valving, such as T-valves 113A, 113B and 113C and 123A, 123B and 123C, respectively, so that water access to the treatment zones can be closed off during the extraction material purging/regenerating cycle of the system and so that purging fluid access to the treatment zones can be closed off during the water treatment cycle of the system. The T-valves could be controlled so that the water and purging fluid streams could not have simultaneous access to the treatment vessels.

The regeneration system includes an acid tank 150, a clean water tank 152 and a base tank 154, and a mixing tank 162. Tanks 150, 152 and 154 are provided, respectively, with outlet conduits 151, 153 and 155, and suitable valving such as T-valves 156, 157 and 158 that control fluid communication from the tanks to purging conduit 160 that communicates with 140A, 140B and 140C. The regeneration process involves elution of the bound metal ions with acid, a chase of the residual acid with water, regeneration with base and a chase of residual base with water. Appropriate monitoring and controls and pumping systems oversee and effect the purging and regeneration steps of the process. The fluids discharged from the treatment vessels are discharged through conduit 142 into the waste/mixing tank 162. The acidic and base regenerant streams and the chase stream are mixed within tank 162 and the pH of the tank is adjusted to the range of 8–10 to precipitate metal hydroxides. After the hydroxides settle out, the solid metal hydroxide is discharged and the supernate is directed back to the raw water storage tank 108 for reprocessing in conduit 164. The processed water, or a portion thereof, from conduit 121 can be directed to tank 152 to be used as the source for chase water.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. An extraction material for use in a system for extracting heavy metal ions or heavy metal complex ions from liquid solutions which comprises the reaction product of a polyamine with a short chain hydrocarbylsilyl formed from first silanizing an extraction material surface by hydrating said surface and reacting the hydrated surface with a short chain trifunctional silane having (a) hydrocarbon substituents containing 1–6 carbon atoms, (b) trifunctional leaving groups providing sites for covalently bonding the hydrocarbylsilyl to the extraction material surface through Si—O bonds, and (c) terminal leaving groups providing sites for covalently bonding the polyamine to the hydrocarbylsilyl through Si—hydrocarbyl bonds; and secondly reacting a polyamine with the hydrocarbylsilyl formed from the silanization of the hydrated surface so as to form an aminohydrocarbyl poller co-valently bound to the extraction material surface, said aminohydrocarbyl polymer having non-crosslinked amino groups multisite bound to said hydrocarbylsilyl.

2. The extraction material according to claim 1 wherein said silane has trifunctional substituents selected from the group consisting of trichloro, trimethoxy and triethoxy substituents.

3. The extraction material according to claim 1 wherein said silane has terminal leaving group substituents selected from the group consisting of halogens, tosylate, mesylate, brosylate and triflate.

4. The extraction material according to claim 1 wherein said hydrocarbon substituents are short chain aliphatic hydrocarbons having 1–6 carbon atoms.

5. The extraction material according to claim 1 wherein said silane has trifunctional substituents selected from the group consisting of trichloro, trimethoxy and triethoxy substituents; said silane has terminal leaving group substituents selected from the group consisting of halogens, tosylate, mesylate, brosylate and triflate; and said hydrocarbon substituents are short chain aliphatic hydrocarbons having 1–6 carbon atoms.

6. The extraction material according to claim 1 wherein said silane has hydrocarbon substituents containing 1–6 carbon atoms and terminal halogen groups; and said polyamine is polyethyleneimine.

7. The extraction material according to claim 6 wherein said silane is bromopropyltrichlorosilane.

8. The extraction material according to claim 1 wherein the aminohydrocarbyl polymer reaction product is alkylated with alkyl groups containing functional reaction groups suited to extract heavy metal ions or complex heavy metal ions.

9. The extraction material according to claim 8 wherein the functional reaction groups are selected from the group consisting of carboxyl-containing groups and cyclic sulfides.

10. The extraction material according to claim 5 wherein the aminohydrocarbyl polymer reaction product is alkylated with alkyl groups containing functional reaction groups suited to extract heavy metal ions or complex heavy metal ions.

11. The extraction material according to claim 10 wherein the functional reaction groups are selected from the group consisting of carboxyl-containing groups and cyclic sulfides.

12. The extraction material according to claim 6 wherein the aminohydrocarbyl polymer reaction product is alkylated with alkyl groups containing functional reaction groups suited to extract heavy metal ions or complex heavy metal ions.

13. The extraction material according to claim 12 wherein the functional reaction groups are selected from the group consisting of carboxyl-containing groups and cyclic sulfides.

14. The extraction material according to claim 7 wherein the aminohydrocarbyl polymer reaction product is alkylated with an alkyl group containing functional reaction groups suited to extract heavy metal ions or complex heavy metal ions.

15. The extraction material according to claim 14 wherein the functional reaction groups are selected from the group consisting of carboxyl-containing groups and cyclic sulfides.

16. A process of producing an extraction material for use in removing heavy metals in ionic form from liquid solutions comprising the steps of:

a) providing a solid extraction material having a surface that is silanizable;

b) covering the surface of said extraction material with a monolayer of water;

c) silanizing the hydrated surface of said extraction material with a silane having short chain hydrocarbyl substituents containing 1–6 carbon atoms and terminal leaving groups so as to hydrocarbylate the extraction material surface, said terminal leaving groups providing sites for covalently bonding a polyamine to the hydrocarbylsilyi through Si—hydrocarbyl bonds;

d) reacting a polyamine with the hydrocarbylated extraction material surface after silanization is complete to form an aminohydrocarbyl polymer covalently bound to the hydrocarbylated extraction material surface with said aminohydrocarbyl polymer having non-crosslinked amino groups multisite bound to said hydrocarbylsilyl to which functional groups having a selective affinity for heavy metal ions and complex heavy metal ions may be covalently attached.

17. The process of claim 16 wherein said silane has trifunctional substituents selected from the group consisting of trichloro, trimethoxy and triethoxy substituents.

18. The process of claim 16 wherein said silane has terminal leaving group substituents selected from the group consisting of halogens, tosylate, mesylate, brosylate and triflate.

19. The process of claim 16 wherein said hydrocarbon substituents are short chain aliphatic hydrocarbons having 1–6 carbon atoms.

20. The process of claim 16 wherein said silane has trifunctional substituents selected from the group consisting of trichloro, trimethoxy and triethoxy substituents; said silane has terminal leaving group substitutents selected from the group consisting of halogens, tosylate, mesylate, brosylate and triflate; and said hydrocarbon substituents are short chain aliphatic hydrocarbons having 1–6 carbon atoms.

21. The process of claim 16 wherein said silane has hydrocarbon substituents containing 1–6 carbon atoms and terminal halogen groups; and said polyamine is polyethyleneimine.

22. The process of claim 21 wherein said silane is bromopropyltrichlorosilane.

23. The process of claim 16 wherein the aminohydrocarbyl polymer reaction product is alkylated with alkyl groups containing functional reaction groups suited to extract heavy metal ions or complex heavy metal ions.

24. The process of claim 20 wherein the aminohydrocarbyl polymer reaction product is alkylated with alkyl groups containing functional reaction groups suited to extract heavy metal ions or complex heavy metal ions.

25. The process of claim 24 wherein the functional reaction groups are selected from the group consisting of carboxyl-containing groups and cyclic sulfides.

26. The process of claim 21 wherein the aminohydrocarbyl polymer reaction product is alkylated with alkyl groups containing functional reaction groups suited to extract heavy metal ions or complex heavy metal ions.

27. The process of claim 26 wherein the functional reaction groups are selected from the group consisting of carboxyl-containing groups and cyclic sulfides.

28. The process of claim 22 wherein the aminohydrocarbyl polymer reaction product is alkylated with alkyl groups containing functional reaction groups suited to extract heavy metal ions or complex heavy metal ions.

29. The process of claim 28 wherein the functional reaction groups are selected from the group consisting of carboxyl-containing groups and cyclic sulfides.

30. The process of claim 23 wherein the functional reaction groups are selected from the group consisting of carboxyl-containing groups and cyclic sulfides.

* * * * *

UNITED STATES PATENT AND TRADEMARK OFFICE
CERTIFICATE OF CORRECTION

PATENT NO. : 5,695,882
DATED : December 9, 1997
INVENTOR(S) : Edward Rosenberg and David C. Pang It is certified that error appears in the above-identified patent and that said Letters Patent is hereby corrected as shown below:

On the title page item [75], Inventors: Edward Rosenberg and David C. Pang

Signed and Sealed this

Third Day of March, 1998

Attest:

BRUCE LEHMAN

*Attesting Officer*  *Commissioner of Patents and Trademarks*